US005720896A

United States Patent [19]

Paterson et al.

[11] Patent Number: 5,720,896

[45] Date of Patent: Feb. 24, 1998

[54] LAUNDRY BLEACHING COMPOSITION

[75] Inventors: Jamie Paterson; Marina Trani, both of Rome, Italy

[73] Assignee: The Procter & Gamble Company, Cincinnati, Ohio

[21] Appl. No.: 347,309

[22] PCT Filed: May 18, 1993

[86] PCT No.: PCT/US93/04689

§ 371 Date: Apr. 27, 1995

§ 102(e) Date: Apr. 27, 1995

[87] PCT Pub. No.: WO93/24407

PCT Pub. Date: Dec. 9, 1993

[30] Foreign Application Priority Data

Jun. 2, 1992 [EP] European Pat. Off. .............. 92201568

[51] Int. Cl.$^6$ .................................................. C01B 15/043

[52] U.S. Cl. ............................... 252/186.27; 252/186.43; 423/415.2; 510/309

[58] Field of Search ......................... 252/186.27, 186.43; 423/415.2; 510/309, 372, 375

[56] References Cited

U.S. PATENT DOCUMENTS

| | | | |
|---|---|---|---|
| H1514 | 1/1996 | Willman et al. | 510/476 |
| 4,428,914 | 1/1984 | Brichard et al. | 423/265 |
| 4,737,306 | 4/1988 | Wichelhaus et al. | 510/315 |
| 4,800,038 | 1/1989 | Broze et al. | 510/303 |
| 5,258,133 | 11/1993 | Chapple | 510/375 |
| 5,382,377 | 1/1995 | Raehse et al. | 510/445 |
| 5,405,413 | 4/1995 | Willey et al. | 8/111 |
| 5,454,982 | 10/1995 | Murch et al. | 510/350 |

FOREIGN PATENT DOCUMENTS

| | | | |
|---|---|---|---|
| 137 669 | 4/1985 | European Pat. Off. | C11D 3/00 |
| 2385837 | 9/1978 | France . | |
| 1553505 | 9/1979 | Germany | C01B 15/10 |
| 4001299 | 1/1992 | Japan | C11D 3/39 |
| 9115567 | 10/1991 | WIPO . | |

*Primary Examiner*—Joseph D. Anthony
*Attorney, Agent, or Firm*—Robert B. Aylor

[57] ABSTRACT

Dry bleaching compositions are disclosed which comprise an alkali metal salt of percarbonate and a dry-form composition comprising a carboxylic polymer. The compositions provide effective bleaching and are as stable upon manufacture and storage.

7 Claims, No Drawings

LAUNDRY BLEACHING COMPOSITION

This application is a 371 of PCT/US93/04689 filed May 18, 1993.

TECHNICAL FIELD

The present invention relates to dry bleaching compositions for laundry. Dry laundry bleaching compositions are described which comprise percarbonate as the bleaching species, said compositions being stable upon manufacture and storage.

BACKGROUND OF THE INVENTION

The inorganic perhydrate bleach most widely used in the context of laundry bleaching is sodium perborate in the form of either the monohydrate or tetrahydrate. However, concerns about the impact of boron salts on the environment have led to an increasing interest in other perhydrate salts, of which sodium percarbonate is the most readily available.

Detergent compositions containing sodium percarbonate are known in the art. Percarbonate salts, particularly sodium percarbonate, are attractive perhydrates for use in detergent compositions because they dissolve readily in water, are weight efficient and, after giving up their available oxygen, provide a useful source of carbonate ions for detergency purposes.

However, the inclusion of percarbonate salts in detergent compositions has been restricted hitherto by the relative instability of the bleach both as is and in use. Sodium percarbonate loses its available oxygen at a significant rate in the presence of ions of heavy metals such as iron, copper and manganese and also in the presence of moisture, these effects being accelerated at temperatures in excess of about 30° C.

Moisture and heavy metal ions are unavoidable components of conventional granular laundry treatment compositions. Also percarbonate decomposition due to moisture becomes more of an issue during storage as laundry treatment products are often stored in humid environments where the product picks up moisture. This has resulted in marginally acceptable percarbonate bleach stability under Northern European summer conditions, where the average maximum temperature over the hottest months is from 21° C. to 25° C., and unacceptable stability under temperatures higher than this. Such conditions are found in the Middle East and Southern Asia and also in Southern Europe where average maximum temperatures are in the 27° C. to 33° C. range for the hottest summer month.

Such temperature accelerated percarbonate decomposition also occurs during the manufacture of the finished product. Indeed, as individual ingredients are mixed together the temperature of the mixture increases, accelerating the decomposition of the percarbonate. Furthermore, the temperature increase is greater if the mixing occurs under adiabatic or semi-adiabatic conditions.

There has therefore been much activity by workers in the field to increase percarbonate stability so as to make it a viable component of detergent formulations. This activity has tended to concentrate on the protection of the percarbonate by coating the crystalline product or by inclusion of stabilizing agents during its manufacture, or both. Thus, while it has proved possible to incorporate percarbonate salts in conventional detergent compositions so as to have acceptable percarbonate stability over periods reflecting normal product shelf life, the percarbonate salts have proved complex and expensive to manufacture. This has restricted their broadscale utilization, as evidenced by the relatively small number of commercially available products containing percarbonate.

It is therefore an object of the present invention to provide a dry laundry bleaching composition incorporating an alkali metal percarbonate bleach, said bleach displaying improved stability both upon the manufacture and the storage of said dry laundry bleaching composition.

It is a further object of the present invention to provide a dry laundry bleaching composition incorporating an alkali metal percarbonate bleach displaying improved stability, in which the percarbonate bleach does not require complex protection techniques.

It has now been found that these objects could be met by formulating a composition comprising an alkali metal salt of percarbonate together with a dry-form composition comprising a polymer, as described hereinafter.

Dry bleaching compositions comprising percarbonate have been described for instance in FR 2,385,837, U.S. Pat. No. 4,428,914, GB 1,553,505 and J 4001299 (abstract). Polymers such as those used in the contest of the present invention have been described for instance in EP 137 669.

The compositions according to the present invention also allow adequate control of the pH in the bleaching liquor, giving appropriate balance between bleaching performance and fabric safety.

SUMMARY OF THE INVENTION

Compositions according to the present invention are dry bleaching compositions comprising from about 10% to about 80% by weight of the total composition of an alkali metal salt of percarbonate bleach and from 0.1% to 50% by weight of the total composition of a dry-form composition comprising at least 50% by weight of said dry-form composition of a polymer according to formula I:

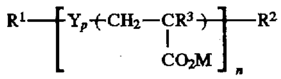

I wherein Y is a comonomer or comonomer mixture; $R^1$ and $R^2$ are bleach- and alkali-stable polymer-end groups; $R^3$ is H, OH or $C_{1-4}$ alkyl; M is H, alkali metal, alkaline earth metal, ammonium or substituted ammonium; p is from 0 to 2; and n is at least 10, or mixtures thereof.

DETAILED DESCRIPTION OF THE INVENTION

The percarbonate:

As a first essential component, the compositions according to the present invention comprise an alkali metal salt of percarbonate, preferably sodium percarbonate. Sodium percarbonate is available commercially as a crystalline solid. Most commercially available material includes a low level of a heavy metal sequestrant such as EDTA, 1-hydroxyethylidene 1,1-diphosphonic acid (HEDP) or an amino-phosphonate, that is incorporated during the manufacturing process. For the purposes of the present invention, the percarbonate can be incorporated into detergent compositions without additional protection.

Whilst heavy metals present in the sodium carbonate used to manufacture the percarbonate can be controlled by the inclusion of sequestrants in the reaction mixture, it is preferred that the percarbonate be protected from heavy metals present as impurities in other ingredients of the product. It has been found that the total level of Iron, Copper and Manganese ions in the product should not exceed 25 ppm and preferably should be less than 20 ppm in order to avoid an unacceptably adverse effect on percarbonate stability.

The compositions according to the present invention comprise from 10% to 80% by weight of the total composition of percarbonate, preferably from 40% to 50%. In other words, in terms of percarbonate activity, the compositions according to the present invention comprise from about 1.5% to about 11% available oxygen, preferably from about 5.6% to 7%.

The dry-form composition:

The second essential component of the invention is a dry-form composition comprising at least 50% by weight of said dry-form composition of a polymer according to formula I:

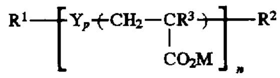

I wherein Y is a comonomer or comonomer mixture; $R^1$ and $R^2$ are bleach- and alkali-stable polymer-end groups; $R^3$ is H, OH or $C_{1-4}$ alkyl; M is H, alkali metal, alkaline earth metal, ammonium or substituted ammonium; p is from 0 to 2; and n is at least 10, or mixtures thereof.

Preferred polymers for use herein fall into two categories. The first category belongs to the class of copolymeric polymers which are formed from an unsaturated polycarboxylic acid such as maleic acid, citraconic acid, itaconic acid, mesaconic acid and salts thereof as first monomer, and an unsaturated monocarboxylic acid such as acrylic acid or an alpha —$C_{1-4}$ alkyl acrylic acid as second monomer. Referring to formula I hereinabove, the polymers belonging to said first class are those where p is not 0 and Y is selected from the acids listed hereinabove. Preferred polymers of this class are those according to formula I hereinabove, where Y is maleic acid. Also, in a preferred embodiment, $R_3$ and M are H, and n is such that the polymers have a molecular weight of from 1000 to 400 000 atomic mass units.

The second category of preferred polymers for use herein belongs to the class of polymers in which, referring to formula I hereinabove, p is 0 and $R^3$ is H or $C_{1-4}$ alkyl. In a preferred embodiment, n is such that the polymers have a molecular weight of from 1000 to 400000 atomic mass units. In a highly preferred embodiment, $R_3$ and M are H.

The alkali-stable polymer end groups $R_1$ and $R_2$ in formula I hereinabove suitably include alkyl groups, oxyalkyl groups and alkyl carboxylic acid groups and salts and esters thereof.

In the above, n, the degree of polymerization of the polymer can be determined from the weight average polymer molecular weight by dividing the latter by the average monomer molecular weight. Thus, for a maleic-acrylic copolymer having a weight average molecular weight of 15,500 and comprising 30 mole % of maleic acid derived units, n is 182 (i.e. 15,500/(116×0.3+72×0.7).

In case of doubt, weight-average polymer molecular weights can be determined herein by gel permeation chromatography using Water [mu] Porasil® GPC 60 $A^2$ and [mu] Bondagel® E-125, E-500 and E-1000 in series, temperature-controlled columns at 40° C. against sodium polystyrene sulphonate polymer standards, available from Polymer Laboratories Ltd., Shropshire, UK, the polymer standards being 0.15M sodium dihydrogen phosphate and 0.02M tetramethyl ammonium hydroxide at pH 7.0 in 80/20 water/acetonitrile.

Of all the above, highly preferred polymers for use herein are those of the first category in which n averages from 100 to 800, preferably from 120 to 400.

The dry-form compositions to be used herein comprise at least 50% by weight of said dry-form composition of a polymer as described hereinbefore, preferably at least 70%, most preferably at least 85%. By "dry", it is meant herein that said dry-form composition comprising said polymer is substantially free of water. Several such dry-form compositions are commercially available, for instance SOKALAN® DCP45, CP5, CP7 and PA40 from BASF, and NORASOL SP02ND® from NORSOHAAS.

The dry bleaching compositions according to the present invention comprise from about 0.1% to about 50% by weight of the total composition of said dry-form composition, preferably from about 1% to about 10%, most preferably from about 1.5% to about 6%.

Optional ingredients:

As an optional but highly preferred component, the compositions according to the present invention further comprise acidifying agent or mixtures thereof. The purpose of said acidifying agent is to control the alkalinity generated by the percarbonate in the bleaching liquor. Said agent is preferably incorporated in the product in an anhydrous form, and to have a good stability in oxidizing environment. Suitable anhydrous acidifying agents for use herein are carboxylic acids such as citric acid, succinic acid, adipic acid, glutaric acid, 3 ketoglutaric acid, citramalic acid, tartaric acid and maleic acid. Other suitable acidifying agents include sodium bicarbonate, and silicic acid. Highly preferred for use herein is anhydrous citric acid. Indeed, citric acid is commercially available in anhydrous form, it additionally acts as a builder and a chelant, and it is biodegradable. The compositions according to the present invention comprise from up to 15% by weight of the total composition of anhydrous citric acid, preferably from 2% to 8%, most preferably about 5%.

Also optional but highly preferred ingredients are peroxy carboxylic acids bleach or precursors thereof, commonly referred to as bleach activators, which are preferably added in a prilled or agglomerated form. Examples of suitable compounds of this type are disclosed in British Patent GB 1 586 769 and GB 2 143 231 and a method for their formation into a prilled form is described in European Published Patent Application EP-A-62 523. Preferred examples of such compounds are tetracetyl ethylene diamine (TAED), sodium 3, 5, 5 trimethyl hexanoyloxybenzene sulphonate, diperoxy dodecanoic acid as described for instance in U.S. Pat. No. 4,818,425 and nonylamide of peroxyadipic acid as described for instance in U.S. Pat. No. 4,259,201 and n-nonanoyloxybenzenesulphonate (NOBS), and acetyl triethyl citrate (ATC) such as described in European Patent application 91870207.7.

Compositions in accordance with the invention can also comprise other optional ingredients such as builder, optical brighteners, anti dusting agents such as olefines and waxes, enzymes, chelants, dispersants, dye transfer inhibition systems, surfactants, soil release agents, photoactivated bleaches such as Zn phthalocyanine sulphonate, dyes, pigments and perfumes are examples of such optional ingredients and can be added in varying amounts as desired.

The compositions according to the present invention naturally comprise inorganic filler salts such as alkali metal carbonates, bicarbonates and sulphates. Such fillers, for instance sodium bicarbonate, may also act as acidifying agent as described herein above. Accordingly, sodium bicarbonate is a preferred filler material for use herein.

The compositions according to the present invention can be made by a variety of methods well known in the art, including dry-mixing, spray drying, coating, agglomeration and granulation and combinations thereof.

The compositions according to the present invention can be prepared with different bulk densities, from conventional granular products to so-called "concentrated" products (i.e. with a bulk density above 600 g/l).

The following examples will illustrate the present invention.

EXAMPLES

1) Part A

The following granular compositions are made by dry-mixing the listed ingredients in the listed proportions.:

| | I | II | III | IV | V |
|---|---|---|---|---|---|
| Sodium percarbonate: | 40.0 | 35.0 | 50.0 | 55.0 | 45.0 |
| TAED: | 8.7 | 7.6 | 12.2 | — | 9.7 |
| Anhydrous citric acid: | 10.0 | — | 6.0 | 5.0 | 3.7 |
| Sodium sulphate: | 33.0 | 47.4 | 12.4 | 21.6 | 5.1 |
| Sodium bicarbonate: | — | — | 15.0 | — | 15.0 |
| Silicate SKS-6: | — | — | — | 10.0 | 16.9 |
| Sodium citrate: | — | 5.0 | — | — | — |
| Sokalan ® CP5 granules: | 5.6 | 4.2 | 3.8 | 5.0 | 3.8 |
| minors: | | | ----up to 100%---- | | |

| | VI | VII | VIII | IX |
|---|---|---|---|---|
| Sodium percarbonate: | 47.0 | 50.0 | 56.0 | 28.0 |
| TAED: | 9.5 | — | 9.4 | 5.0 |
| Anhydrous citric acid: | 7.0 | 6.0 | 5.0 | 5.0 |
| Sodium sulphate: | 17.4 | 2.1 | 10.2 | 46.2 |
| Sodium bicarbonate | 13.0 | 5.0 | — | — |
| Silicate SKS-6 | — | 10.0 | — | — |
| Sokalan ® CP5 granules: | 4.2 | 8.1 | 15.9 | 6.4 |
| NOBS: | — | 10.3 | — | — |
| minors: | | ----up to 100%---- | | |

2) Part B

The following compositions were made by mixing the listed ingredients in the listed proportions. The self heating rates of the products were monitored as follows. The product is made and put in a bottle. The bottle is then put in an oven which is heated up to 70° C. A probe in the product allows to monitor the temperature of the product. As soon as the product reaches 70° C., the bottle is covered and the system is isolated in an adiabatic/thermo bell which maintains the temperature of the oven constant at 70° C. as above. This places the product in adiabatic conditions and from thereon, the temperature of the product is monitored.

The temperature increase thus measured is due to the self-heating of the product (runaway reaction). The results below list three self heating rates, all in °C./hour: SHR1 is the average temperature increase measured during the first two hours of adiabatic conditions; SHR2 is the average temperature increase measured during the three following hours, and SHR3 is the average temperature increase measured beyond 5 hours.

The table below lists the results obtained for various compositions, with and without dry form polymer composition of the invention. In some cases the runaway reaction was out of control and experiments had to be interrupted for safety reasons. Such experiments are marked ooc (out of control).

| Compositions: | X | XI | XII | XIII | XIV |
|---|---|---|---|---|---|
| Sodium percarbonate: | 46.0 | 46.0 | 46.0 | 46.0 | 46.0 |
| TAED: | 9.7 | 9.7 | 9.7 | 9.7 | 9.7 |
| Sodium sulphate: | 24.3 | 34.3 | 39.3 | 40.3 | 34.3 |
| Sokalan ® CP5 granules: | 20.0 | 10.0 | 5.0 | 4.0 | — |
| Sokalan ® CP5 powder: | — | — | — | — | 10.0 |
| SHR1: | 0.7 | 1.1 | 1.0 | 0.3 | 0.1 |
| SHR2: | 0.4 | 0.4 | 0.3 | 0.8 | 0.1 |
| SHR3: | 0.0 | 0.0 | 0.0 | 0.0 | 0.0 |

-continued

| Compositions: | XV | XVI | XVII | XVIII | Control |
|---|---|---|---|---|---|
| Sodium percarbonate: | 46.0 | 46.0 | 46.0 | 46.0 | 46.0 |
| TAED: | 9.7 | 9.7 | 9.7 | 9.7 | 9.7 |
| Sodium sulphate: | 34.3 | 34.3 | 34.3 | 34.3 | 34.3 |
| Sokalan ® CP45 powder: | 10.0 | — | — | — | |
| Sokalan ® CP7 granular: | — | 10.0 | — | — | — |
| Sokalan ® PA40: | — | — | 10.0 | — | — |
| Nordsol ® SP02ND: | — | — | — | 10.0 | — |
| SHR1: | 2.6 | 1.0 | 2.5 | 1.6 | 4.0 |
| SHR2: | 1.9 | 0.3 | 1.0 | 1.0 | 10.8 |
| SHR3: | 1.0 | 0.0 | 0.8 | 0.5 | ooc |

Compositions I through XVIII comprise a dry-form composition comprising a polymer, according to the present invention. They all exhibit outstanding stability. The control composition, which does not comprise any such dry-form composition underwent a runaway reaction which was out of control.

3) Part C

The experimental protocol set out in part B) was repeated with the following compositions which are not in accordance with the present invention.

| Compositions: | XIX | XX | XXI | XXII |
|---|---|---|---|---|
| Sodium percarbonate: | 46.0 | 46.0 | 46.0 | 46.0 |
| TAED: | 9.7 | 9.7 | 9.7 | 9.7 |
| Sodium sulphate: | 44.3 | 34.3 | 34.3 | 34.3 |
| Norasol ® WL-1: | — | 10.0 | — | — |
| Norasol ® WL-2: | — | — | 10.0 | — |
| Norasol ® WL-3: | — | — | — | 10.0 |
| SHR1: | 4.0 | 3.1 | 5.3 | 3.3 |
| SHR2: | 10.8 | 3.1 | ooc | ooc |
| SHR3: | ooc | ooc | — | — |

| Compositions: | XXIII | XXIV | XXV | XXVI |
|---|---|---|---|---|
| Sodium percarbonate: | 46.0 | 46.0 | 46.0 | 46.0 |
| TAED: | 9.7 | 9.7 | 9.7 | 9.7 |
| Sodium sulphate: | 34.3 | 34.3 | 34*.3 | 34.3 |
| Polyvinyl pyrrolidone: | 10.0 | — | — | — |
| Polyethylene glycol: | — | 10.0 | — | — |
| Polyvinyl alcohol: | — | — | 10.0 | — |
| Sokalan ® CP2: | — | — | — | 10.0 |
| SHR1: | 5.2 | 60.0 | 5.5 | 3.2 |
| SHR2: | 8.1 | ooc | ooc | 6.7 |
| SHR3: | ooc | ooc | — | ooc |

Polymer samples WL-1, WL-2 and WL-3 are dry form compositions containing a polycarboxylate polymer according to formula I herein, but at less than 40% by weight. PVP, PVA, PEG and Polymer sample Sokalan® CP2 are polymers which do not fall within formula I herein.

No percarbonate stabilization could be achieved with the polymer samples tested in part C), and all reactions had to be stopped before 5 hours.

We claim:

1. A dry bleaching composition comprising:

a) from 40% to 50%, by weight of the total composition, of sodium percarbonate bleach;

b) from 4% to 50%, by weight of the total composition, of a composition substantially free of water comprising at least 50% of a polymer according to formula I:

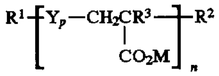

wherein $R^1$ and $R^2$ are bleach stable polymer end groups selected from the group consisting of alkyl, oxyalkyl, alkylcarboxylic acid groups, their salts and esters thereof; Y is selected from the group consisting of maleic acid, citraconic acid, itaconic acid, mesaconic acid, copolymers of acrylic acid, with maleic acid, citraconic acid, itaconic acid, or mesaconic acid, and copolymers of $C_{1-4}$ alpha acrylic acid with maleic acid, citraconic acid, itaconic acid, or mesaconic acid; $R^3$ is selected from the group consisting of H, OH, and $C_{1-4}$ alkyl; M is selected from the group consisting of H, alkali metal, alkaline earth metal, ammonium, and substituted ammonium; p is from 0 to 2; and n is such that the polymer has a molecular weight of from 1000 to 400,000 atomic mass units; said total composition being free of surfactant.

2. A dry bleaching composition according to claim 1 wherein, in formula I, p is not 0 and Y is selected from the group consisting of maleic acid, citraconic acid, itaconic acid, and mesaconic acid.

3. A dry bleaching composition according to claim 1 wherein, in formula I, p is 0.

4. A dry bleaching composition according to claim 1 wherein, in formula I, $R_3$ and M are H.

5. A dry bleaching composition according to claim 1 which further comprises a bleach activator.

6. A dry bleaching composition according to claim 1 which further comprises an acidifying agent.

7. A dry bleaching composition according to claim 6 which comprises, as an acidifying agent, from 2% to 8%, by weight of the total composition, of anhydrous citric acid.

* * * * *